(12) United States Patent
Lepre

(10) Patent No.: US 12,017,858 B2
(45) Date of Patent: Jun. 25, 2024

(54) SYSTEMS AND METHODS FOR AUTOMATED CONTROL OF A BEAM STAGELOADER BOOTEND

(71) Applicant: Joy Global Underground Mining LLC, Warrendale, PA (US)

(72) Inventor: Benjamin John Robert Lepre, Worcester (GB)

(73) Assignee: JOY GLOBAL UNDERGROUND MINING LLC, Warrendale, PA (US)

(*) Notice: Subject to any disclaimer, the term of this patent is extended or adjusted under 35 U.S.C. 154(b) by 628 days.

(21) Appl. No.: 17/203,885

(22) Filed: Mar. 17, 2021

(65) Prior Publication Data

US 2021/0198043 A1 Jul. 1, 2021

Related U.S. Application Data

(63) Continuation of application No. 16/456,871, filed on Jun. 28, 2019, now Pat. No. 10,968,040.

(Continued)

(51) Int. Cl.
*B65G 15/26* (2006.01)
*B65G 21/12* (2006.01)
(Continued)

(52) U.S. Cl.
CPC ............. *B65G 15/26* (2013.01); *B65G 21/12* (2013.01); *B65G 21/14* (2013.01); *B65G 43/00* (2013.01);
(Continued)

(58) Field of Classification Search
CPC ........ B65G 15/26; B65G 15/64; B65G 21/12; B65G 21/14; B65G 43/00; B65G 65/00;
(Continued)

(56) References Cited

U.S. PATENT DOCUMENTS

| | | |
|---|---|---|
| 3,378,303 A | 4/1968 | Weber |
| 8,151,968 B2 | 4/2012 | Bremhorst |

(Continued)

FOREIGN PATENT DOCUMENTS

| | | |
|---|---|---|
| CN | 103912276 A | 7/2014 |
| CN | 204061380 U | 12/2014 |

(Continued)

OTHER PUBLICATIONS

Chinese Patent Office Action for Related Application No. 201910575331.0 dated Dec. 2, 2022 (10 pages, including a brief English summary).

(Continued)

*Primary Examiner* — Gene O Crawford
*Assistant Examiner* — Keith R Campbell
(74) *Attorney, Agent, or Firm* — Husch Blackwell LLP

(57) ABSTRACT

Automated control of a longwall stageloader bootend using a plurality of sensors. The sensors include lift sensors, side shift sensors, advance sensors, angle sensors, and conveyor belt sensors. Signals from the plurality of sensors are received by a controller and used to control the operation of the bootend. Controlling the operation of the bootend includes controlling, for example, one or more lift actuators, one or more side shift actuators, one or more advance actuators, and one or more belt actuators. These various actuators can be controlled to, for example, advance the bootend, level the bootend, or match the interfaces between the bootend and a stageloader or a conveyor structure.

20 Claims, 15 Drawing Sheets

Related U.S. Application Data

(60) Provisional application No. 62/792,164, filed on Jan. 14, 2019.

(51) Int. Cl.

| | | |
|---|---|---|
| *B65G 21/14* | (2006.01) | |
| *B65G 43/00* | (2006.01) | |
| *E21C 35/24* | (2006.01) | |
| *E21F 13/06* | (2006.01) | |
| *E21C 25/68* | (2006.01) | |
| *E21C 35/20* | (2006.01) | |
| *E21F 13/02* | (2006.01) | |

(52) U.S. Cl.
CPC .............. *E21C 35/24* (2013.01); *E21F 13/06* (2013.01); *E21C 25/68* (2013.01); *E21C 35/20* (2013.01); *E21F 13/02* (2013.01)

(58) Field of Classification Search
CPC .......... E21C 25/68; E21C 35/20; E21C 35/24; E21F 13/02; E21F 13/06; E21F 13/08
See application file for complete search history.

(56) References Cited

U.S. PATENT DOCUMENTS

| | | | |
|---|---|---|---|
| 8,777,325 | B2 | 7/2014 | Wesselmann et al. |
| 8,820,509 | B2 | 9/2014 | Shatters |
| 8,931,628 | B2 | 1/2015 | Hill |
| 9,096,389 | B2 | 8/2015 | Neilson et al. |
| 9,422,112 | B2 | 8/2016 | Worthington et al. |
| 9,771,799 | B2 | 9/2017 | de Lore et al. |
| 9,810,065 | B2 | 11/2017 | Rimmington |
| 9,932,177 | B2 * | 4/2018 | Watson ................. E21F 13/066 |
| 10,082,026 | B2 | 9/2018 | Siegrist et al. |
| 10,082,567 | B2 * | 9/2018 | Rimmington ............ G08B 5/36 |
| 10,087,754 | B2 | 10/2018 | Rimmington |
| 2014/0067194 | A1 | 3/2014 | Gralow et al. |

FOREIGN PATENT DOCUMENTS

| | | |
|---|---|---|
| CN | 206456914 U | 9/2017 |
| CN | 107352250 A | 11/2017 |
| CN | 207209320 U | 4/2018 |
| CN | 207740000 U | 8/2018 |
| CN | 209618214 U | 11/2019 |
| GB | 2087454 A | 5/1982 |

OTHER PUBLICATIONS

Jin, et al., "A Method of Weight-determining Method Based on Similarity Coefficients," Journal of Taiyuan University of Science and Technology, vol. 36, No. 1, Feb. 2015 (4 pages).
Sammarco, "A Guidance Sensor for Continuous Mine Haulage" U.S. Department of Energy, IEEE Industry Applications Conference Thirty First IAS Annual Meeting, Oct. 1996.
United Kingdom Intellectual Property Office Search Report for Application No. GB1909305.3 dated Dec. 18, 2019 (3 pages).
Jianhua, "Research and development of intelligent belt conveyor self0moving tail," Journal of Taiyuan University of Science and Technology, vol. 36, No. 1, Feb. 2015 (4 pages).
Chinese Patent Office Action for Application No. 201910575331.0 dated Jun. 17, 2022 (15 pages including an English translation).
Australian Examination Report for Application No. 2022203128 dated Nov. 13, 2023 (3 pages).
Australian Examination Report for Application No. 2022203133 dated Nov. 13, 2023 (3 pages).

* cited by examiner

SYSTEMS AND METHODS FOR AUTOMATED CONTROL OF A BEAM STAGELOADER BOOTEND

RELATED APPLICATIONS

This application is a continuation of U.S. patent application Ser. No. 16/456,871, filed Jun. 28, 2019, which claims priority to U.S. Provisional Patent Application No. 62/792,164, filed Jan. 14, 2019, the entire contents of each of which are hereby incorporated by reference.

FIELD

Embodiments described herein relate to a beam stageloader bootend of a longwall mining system.

SUMMARY

A bootend of a longwall mining beam stageloader is conventionally statically positioned (i.e., left in its original place). However, adjustments to the bootend may be desirable over time (e.g., as regularly as on an hourly basis). Adjustments to the bootend can be used to ensure that (1) mineral from the stageloader is loaded uniformly onto the interfacing conveyor belt (and without spillage), and (2) the bootend interfaces with the conveyor structure so the conveyor is not unduly stressed.

However, operation and position adjustment of the bootend conventionally requires manual operation by an operator. Manually maneuvering a bootend includes direct activation of hydraulic spool valves or pushbutton controls of hydraulic cylinders (e.g., solenoid operated valves). The operator must also control the bootend based on his/her interpretation of the bootend's position. Such subjectivity promotes excess wear/stress on the conveyor and associated components, mineral spillage, and puts personnel at risk of physical harm. Potential physical harms can include injection injury or striking risk from stored hydraulic energy, crushing or entrapment risk from moving heavy equipment, and respiratory exposure risk from dust.

Embodiments described herein relate to the automated control of a longwall mining beam stageloader bootend based on signals from a plurality of sensors. The signals from the plurality of sensors are used by a controller to control the bootend. By automating the operation of the bootend, the need for human positioning control is reduced and operator safety is improved. Automated operation of the bootend also provides additional advantages over conventional, manually-operated bootends. For example, an automated bootend enables the ability to: (1) "train" mineral onto the bootend (e.g., to further reduce mineral spillage); (2) match conveyor belt trajectory and adjust for belt drift; (3) navigate deviations in the floor/ground to ensure levelness; (4) match angles and profiles of interfacing equipment (e.g., the bootend could be set at a correct pitch angle and height to match the conveyor structure while also matching the projection of mineral from the longwall stageloader); (5) reduce wear on components and increase conveyor belt life; and (6) use lift cylinder pressures to determine and evenly distribute floor pressure at each bootend foot.

Embodiments described herein provide a beam stageloader bootend that includes at least one lift actuator configured to raise or lower a portion of the bootend, a lift sensor, an angle sensor, and a controller. The lift sensor is associated with the at least one lift actuator. The lift sensor is configured to generate a lift sensor output signal related to a position of the at least one lift actuator. The angle sensor is configured to generate an angle sensor output signal related to an angle of the bootend. The controller is connected to the lift sensor, the angle sensor, and the at least one lift actuator. The controller includes a non-transitory computer readable medium and a processor. The controller includes computer executable instructions stored in the computer readable medium for controlling operation of the bootend to receive the lift sensor output signal, receive the angle sensor output signal, determine a longitudinal position of the bootend and an axial position of the bootend based on the lift sensor output signal and the angle sensor output signal, and generate a control signal for the at least one lift actuator to adjust the position of the at least one lift actuator when the longitudinal position of the bootend or the axial position of the bootend indicates that the bootend is not level.

Embodiments described herein provide a computer-implemented method for controlling a beam stageloader bootend. The bootend includes at least one lift actuator, a lift sensor, and an angle sensor. The method includes receiving a lift sensor output signal from the lift sensor. The lift sensor output signal is related to a position of the at least one lift actuator. The method also includes receiving an angle sensor output signal from the angle sensor. The angle sensor output signal is related to an angle of the bootend. The method also includes determining a longitudinal position of the bootend and an axial position of the bootend based on the lift sensor output signal and the angle sensor output signal, and generating a control signal for the at least one lift actuator to adjust the position of the at least one lift actuator when the longitudinal position of the bootend or the axial position of the bootend indicates that the bootend is not level.

Embodiments described herein provide a controller for controlling a beam stageloader bootend. The controller includes a non-transitory computer readable medium and a processor. The controller includes computer executable instructions stored in the computer readable medium for controlling operation of the bootend to receive a lift sensor output signal from a lift sensor, receive an angle sensor output signal from an angle sensor, determine a longitudinal position of the bootend and an axial position of the bootend based on the lift sensor output signal and the angle sensor output signal, and generate a control signal for at least one lift actuator to adjust the position of the at least one lift actuator when the longitudinal position of the bootend or the axial position of the bootend indicates that the bootend is not level. The lift sensor output signal is related to a position of the at least one lift actuator. The angle sensor output signal is related to an angle of the bootend.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Figure 1:
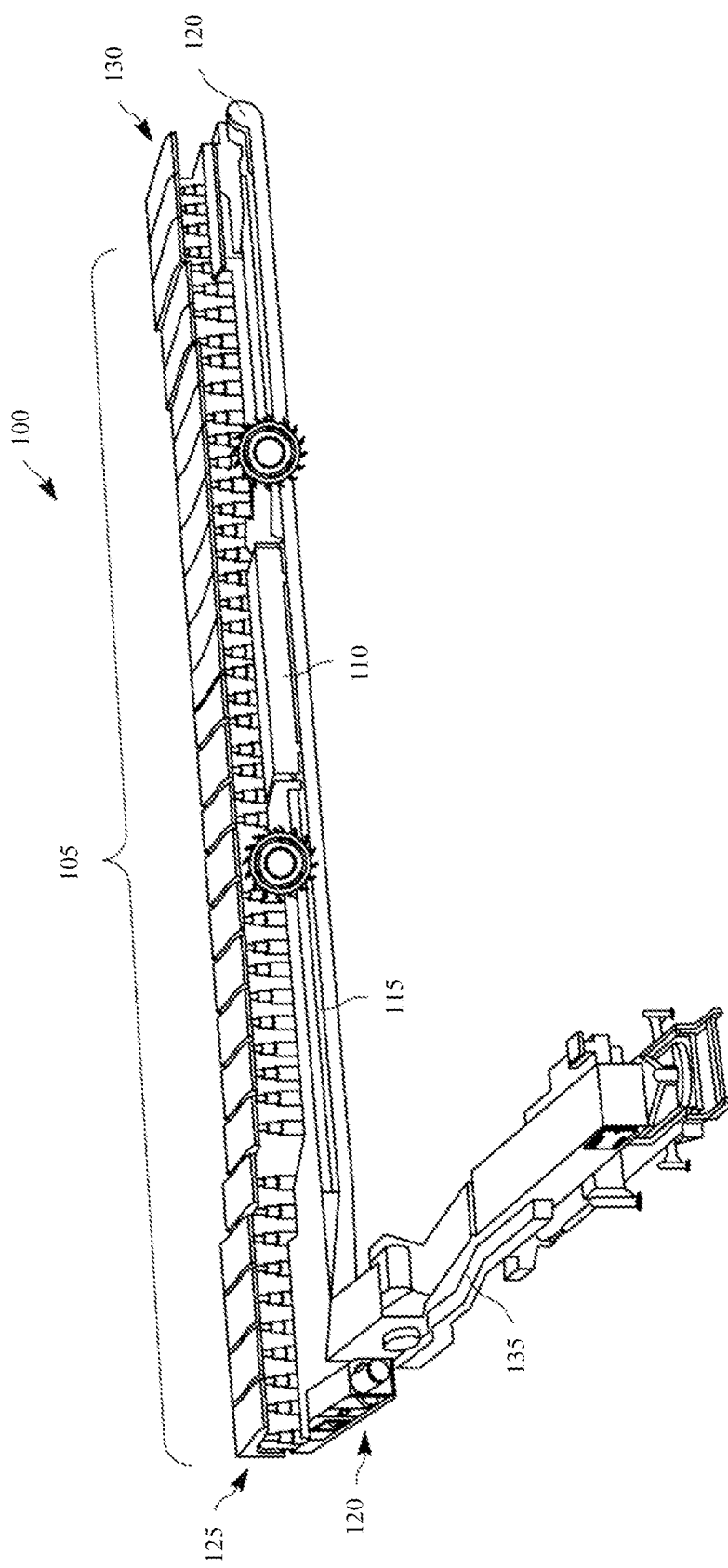
FIGS. 1 and 2 illustrate a longwall mining system, according to embodiments described herein.

FIG. 1 illustrates a longwall mining system 100. The longwall mining system 100 includes roof supports 105 and a shearer 110. The roof supports 105 are interconnected parallel to a material face (not shown) by electrical and hydraulic connections. The roof supports 105 shield the shearer 110 from the overlying geological strata. The number of roof supports 105 used in the longwall mining system 100 depends on the width of the material face being mined since the roof supports 105 are intended to protect the full width of the material face from the strata. The shearer 110 is propagated along the line of the material face by an armored face conveyor ("AFC") 115, which has a dedicated rack bar for the shearer 110 running parallel to the material face between the face itself and the roof supports 105. The AFC 115 also includes a conveyor parallel to the shearer rack bar, such that excavated material can fall onto the conveyor to be transported away from the face. The conveyor and rack bar of the AFC 115 are driven by AFC drives 120 located at a maingate 125 and a tailgate 130, which are at distal ends of the AFC 115. The AFC drives 120 allow the AFC 115 to continuously transport coal toward the maingate 125 (left side of FIG. 1), and allows the shearer 110 to be hauled along the rack bar of the AFC 115 bi-directionally across the material face. In some embodiments, depending upon the specific mine layout, the layout of the longwall mining system 100 can be different than described above. For example, the maingate 125 can be on the right distal end of the AFC 115 and the tailgate 130 can be on the left distal end of the AFC 115.

Figure 2:
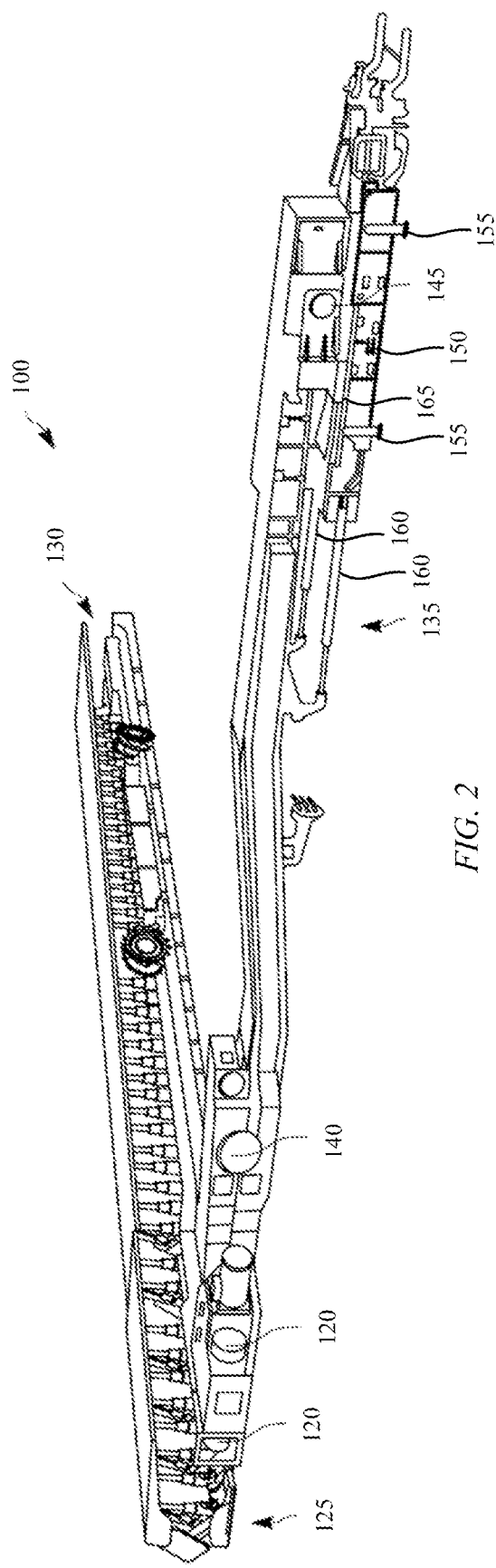

The longwall mining system 100 also includes a beam stageloader ("BSL") 135 arranged perpendicularly at the maingate 125 of the AFC 115. FIG. 2 illustrates a perspective view of the longwall mining system 100 and an expanded view of the BSL 135. When the won material hauled by the AFC 115 reaches the maingate 125, it is routed through a 90° turn onto the BSL 135. In some embodiments, the BSL 135 interfaces with the AFC 115 at an oblique angle (e.g., a non-right angle). The BSL 135 then prepares and loads the material onto a maingate conveyor (see FIG. 3), which transports the material to the surface. The material is prepared to be loaded by crusher or sizer 140, which breaks down the material to improve loading onto the maingate conveyor. The BSL 135's conveyor is driven by a BSL drive 145. A bootend 150 is positioned between BSL 135 and the and the maingate conveyor. The bootend 150 includes lift cylinders 155 (e.g., bootend feet), advance cylinders 160, and side shift cylinders 165.

Figure 3:
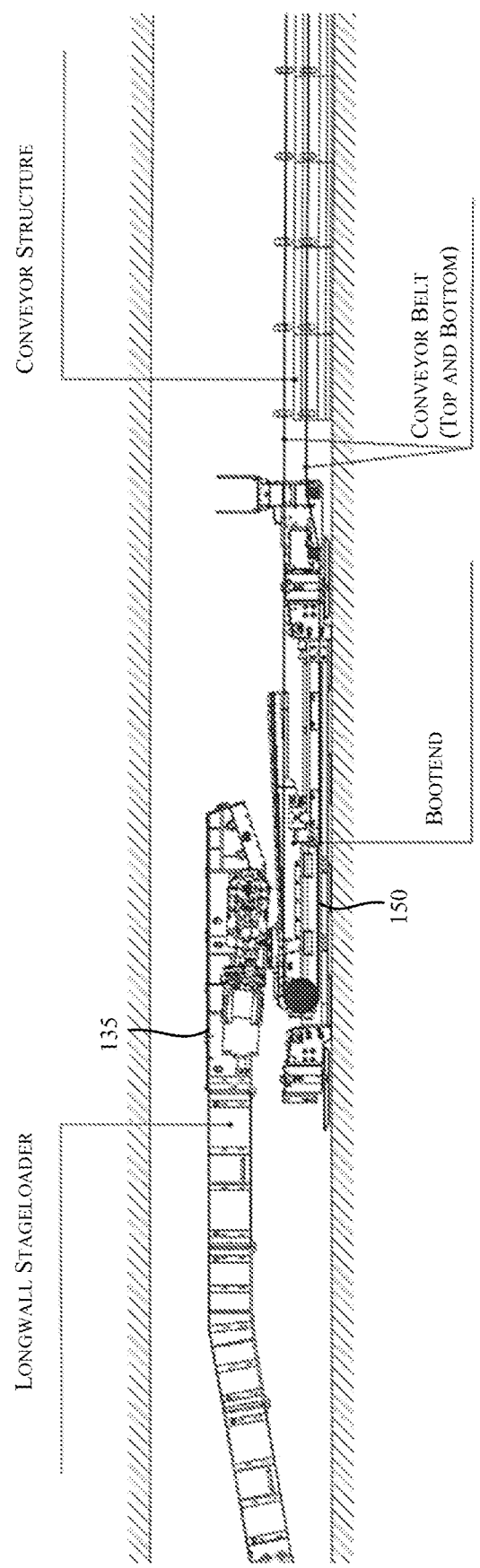
FIG. 3 illustrates interfaces of a stageloader, a bootend, and a conveyor, according to embodiments described herein.

FIG. 3 illustrates an interface between the BSL 135 and the bootend 150, and an interface between the bootend 150 and a conveyor structure including a conveyor belt (e.g., a maingate conveyor).

Figure 4:
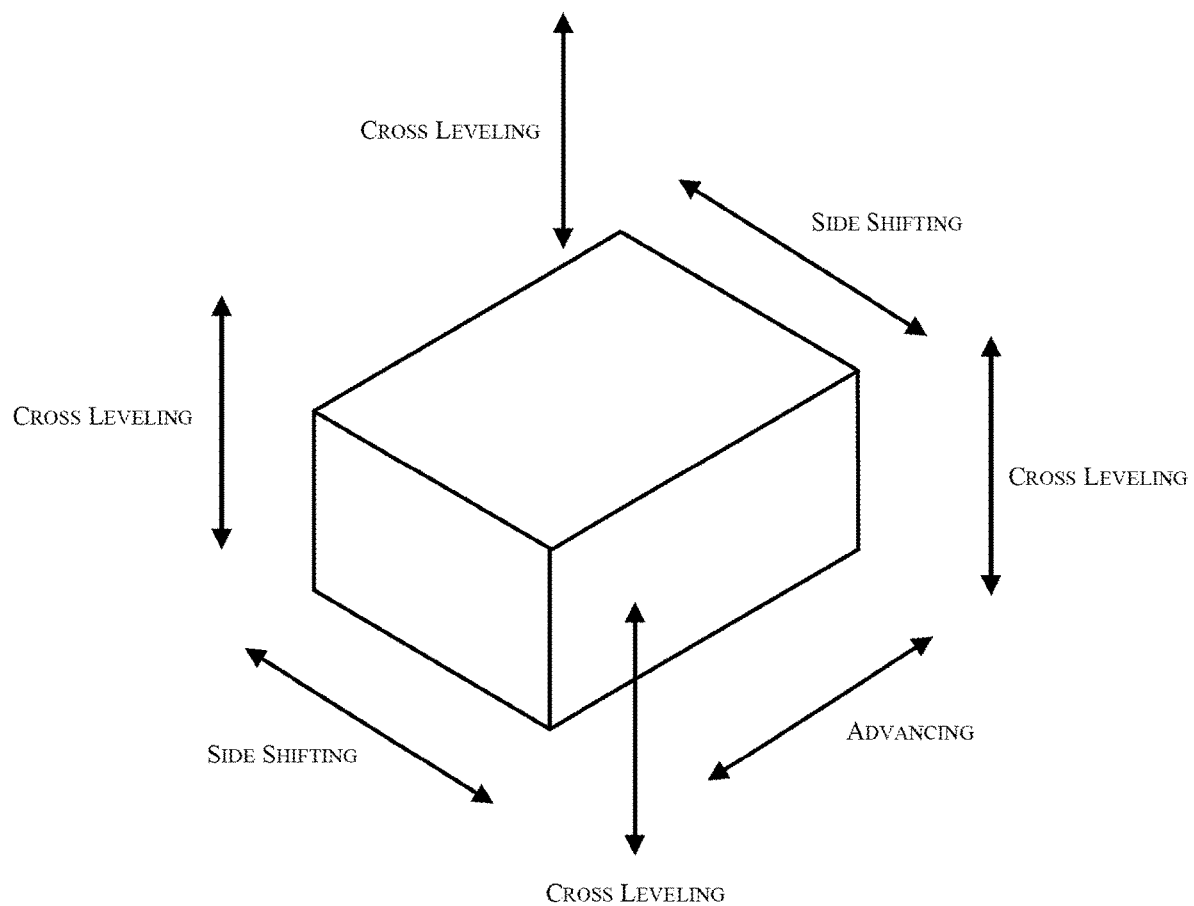
FIG. 4 is a diagram of bootend positioning functions, according to embodiments described herein.

FIG. 4 illustrates positioning functions for the bootend 150. The bootend 150 utilizes several functions to control its positioning. The functions include a lift function, a side shift function, and an advance function. The bootend 150 can be raised or lowered to achieve cross leveling (e.g., by lift cylinders 155). The lift function utilizes the lift cylinders 155 in each corner of the bootend 150 (e.g., four lift cylinders 155) to control height or to compensate for floor/ground deviations. The bootend 150 can be advanced (e.g., by advance cylinders 160). The advance function utilizes the advance cylinders 160 to position the bootend 150 longitudinally with respect to the BSL 135 (to which it is mechanically connected) and the interface with the conveyor structure (e.g., the maingate conveyor). The bootend 150 can be side shifted (e.g., laterally moved by side shift cylinders 165). The side shift function utilizes the side shift cylinders 165 to position the bootend 150 axially or laterally (i.e., from side-to-side). In some embodiments, positioning of the bootend 150 can also be controlled in relation to the bootend 150's spatial awareness in a roadway with respect to a predefined position (e.g., roadway centerline).

Figure 5:
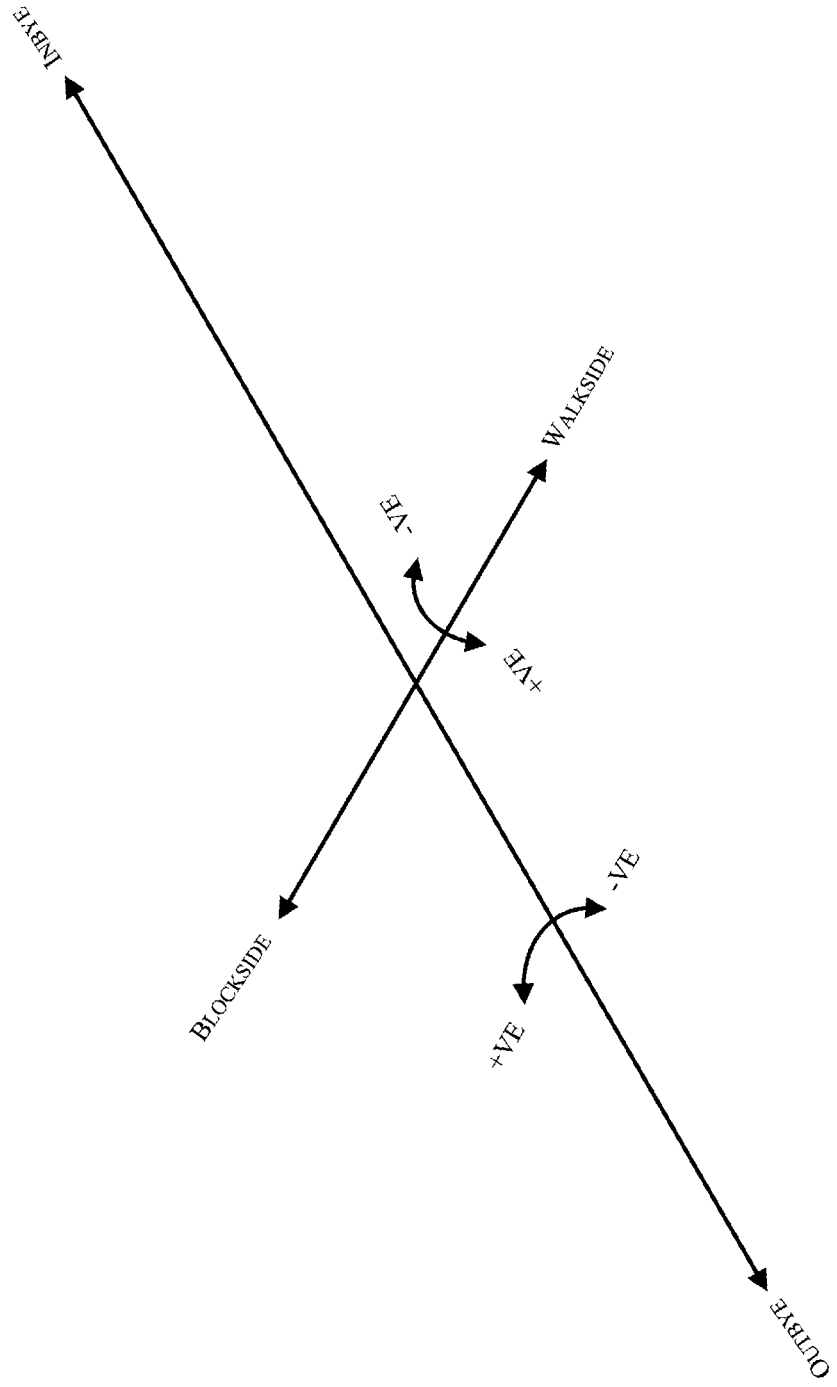
FIG. 5 is a diagram illustrating bootend pitch and roll, according to embodiments described herein.

FIG. 5 illustrates pitch and roll parameters in a three-dimensional space for the bootend 150. Sensor data can be used to profile the operation of the bootend 150 in the three-dimensional space to determine pitch and roll. Pitch corresponds to longitudinal position (commonly referred to as inbye-to-outbye). Roll corresponds to axial or lateral position (commonly referred to as walkside-to-blockside).

Figure 6:
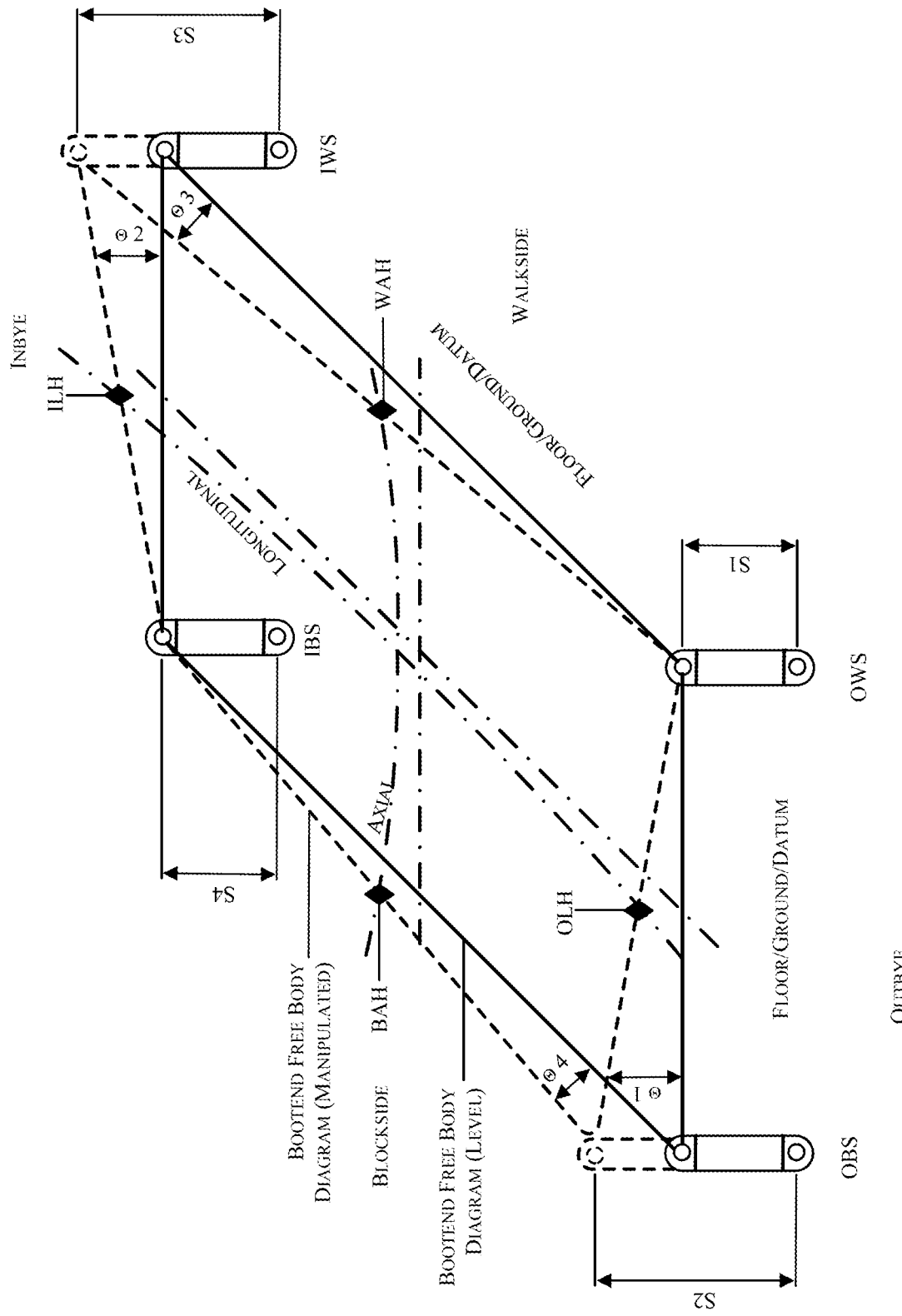
FIG. 6 is a free-body diagram of pitch and roll for a bootend, according to embodiments described herein.

FIG. 6 illustrates a free-body diagram of the bootend 150 that can be used to implement pitch and roll control, where OBS is outbye blockside, OWS is outbye walkside, IBS is inbye blockside, IWS is inbye walkside, OLH is outbye longitudinal height, ILH is inbye longitudinal height, BAH is blockside axial height, WAH is walkside axial height, S1 is the stroke measurement of the outbye walkside cylinder, S2 is the stroke measurement of the outbye blockside cylinder, S3 is the stroke measurement of the inbye walkside cylinder, S4 is the stroke measurement of the inbye blockside cylinder, θ1 is outbye axial angle, θ2 is inbye axial angle, θ3 is walkside longitudinal angle, and θ4 is blockside longitudinal angle.

A combination of angle sensors (e.g., inclinometers) and linear transducers can be used to determine pitch and roll of the bootend 150. In some embodiments, angle sensor signals are compared against cylinder stroke position. For example, if the walkside of the bootend 150 is at 200 mm extension and the blockside of the bootend 150 is at 400 mm extension, but the angle sensors read ±0.5°, the bootend 150 could be considered level. No changes to the bootend 150 would be required because the bootend 150 is compensating for localized grades. However, if the lift cylinders 155 were at the same strokes but the angle sensors read 3.5° (or at different strokes but the inclinometers still showed 3.5°), either the walkside or the blockside of the bootend 150 would have to be changed to level the bootend 150. Similar analysis can be performed with respect to pitch (i.e., inbye-to-outbye). However, pitch (or fore and aft) is typically dictated by the grade of the roadway and further inputs may need to be considered. For example, if the grade of the roadway is +2°, this could be set as a value for level and cylinder positions could be compensated to achieve +2°. In some embodiments, the grade of the roadway can be set as a reference point (e.g., for a device or sensor mounted on a conveyor belt structure). In some embodiments, a tolerance can be set for determining when the bootend 150 is level (e.g., ±0.5°, ±1.0°, etc.).

In some embodiments, bootend foot pressures can be determined from the lift cylinders 155 (e.g., using a pressure sensor) and used to control the bootend 150. For example, determining bootend foot pressures can be useful in poor floor conditions or with a damaged machine when it is not permissible to have the bootend 150 on its belly (i.e., not raised off the floor). The contact pressure at each bootend foot can also change during the BSL 135 advance sequence, so dynamically adjusting bootend foot pressures will help to balance the bootend 150.

Figure 7:
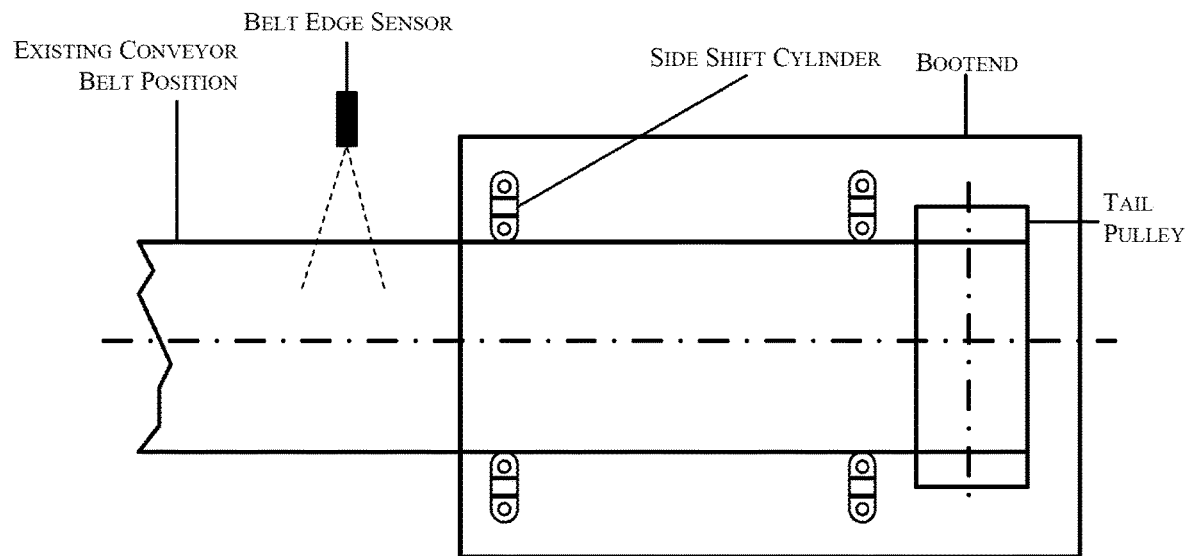
FIGS. 7 and 8 are free-body diagrams of yaw for a bootend, according to embodiments described herein.
Figure 8:
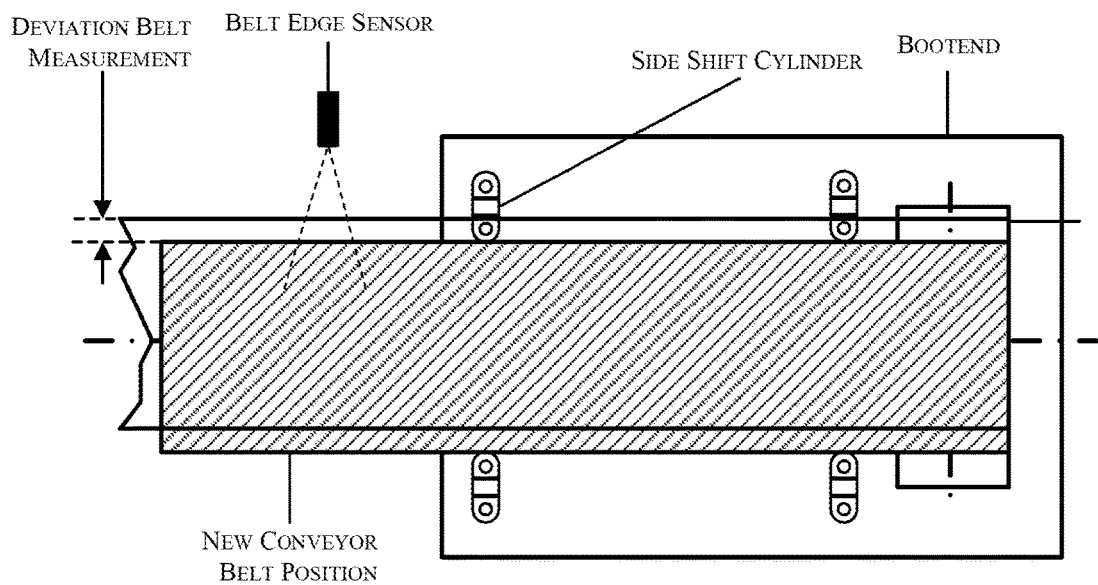

FIGS. 7 and 8 illustrates the yaw parameter for the bootend 150. Yaw relates to the clockwise/counterclockwise planar rotational positon (commonly referred to as tracking) of the bootend 150. Sensor data can be used to implement yaw control for the bootend 150. The yaw control generally corresponds to the ability to detect belt position relative to a predefined centerline or nominal value in relation to sensors or a predefined datum within a roadway. Adjustments to the bootend 150 are based on measured belt position and an acceptable tolerance band or hysteresis. The bootend 150 can be repositioned such that the belt edge or other datum falls within the acceptable limits. For example, if the nominal value of acceptance is a range between 300 mm-350 mm, any measurement outside of this range will cause a change in bootend position to bring the belt or bootend 150 back within the range.

Figure 9A:
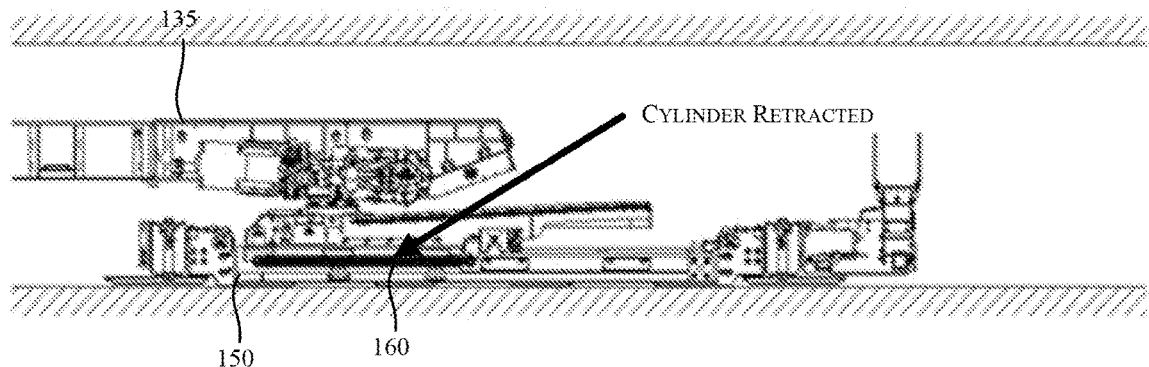
FIGS. 9A, 9B, and 9C illustrate automated control of bootend advance.
Figure 9B:
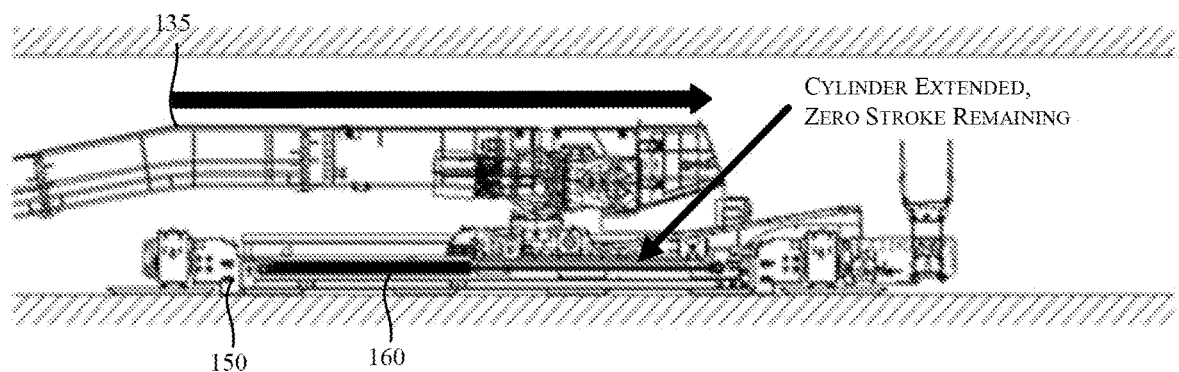
Figure 9C:
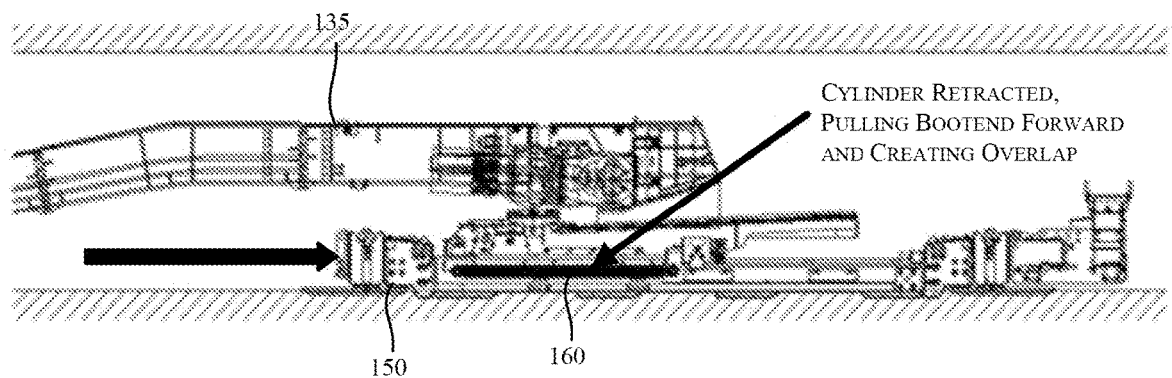

FIGS. 9A, 9B, and 9C illustrate advance control of the bootend 150. The bootend advance cylinders 160 enable the bootend 150 to be automatically advanced or retracted gradually to account for the changing position of the BSL 135 (e.g., when there is no more stroke available for the advance cylinders 160). For example, the bootend 150 can be advanced as a function of the depth of cut by the shearer 110. As an illustrative example, if the shearer 110 depth of cut (i.e., drum web depth or sump depth) is 800 mm, the BSL 135 will push over 800 mm with each cycle of the shearer 110. If the advance cylinders 160 of the bootend have a cylinder stroke of 2400 mm, the bootend 150 can be controlled to accommodate three shearer cycles before the bootend 150 would need to be moved. After the advance cylinders 160 have been fully extended, the advance cylinders can be retracted to pull the bootend 150 forward and again maximize overlap with the BSL 135. FIG. 9A illustrates the bootend 150 with advance cylinders 160 fully retracted. As the BSL 135 is advanced for each shearer cycle, the advance cylinders 160 are extended. FIG. 9B illustrates the bootend 150 with advance cylinders 160 fully extended. When the advance cylinders 160 are fully extended, the bootend 150 is pulled forward by retracting the advance cylinders 160. As the bootend 150 is pulled forward, the available overlap between the BSL 135 and the bootend 150 is again maximized, as illustrated in FIG. 9C. Linear transducers are mounted next to the advance cylinders 160 or integral to the advance cylinders 160 for generating signals related to the amount of extension of the advance cylinders 160. If the advance cylinders are fully extended, the advance cylinders 160 can be controlled to be retracted and pull the bootend 150 forward.

Figure 10:
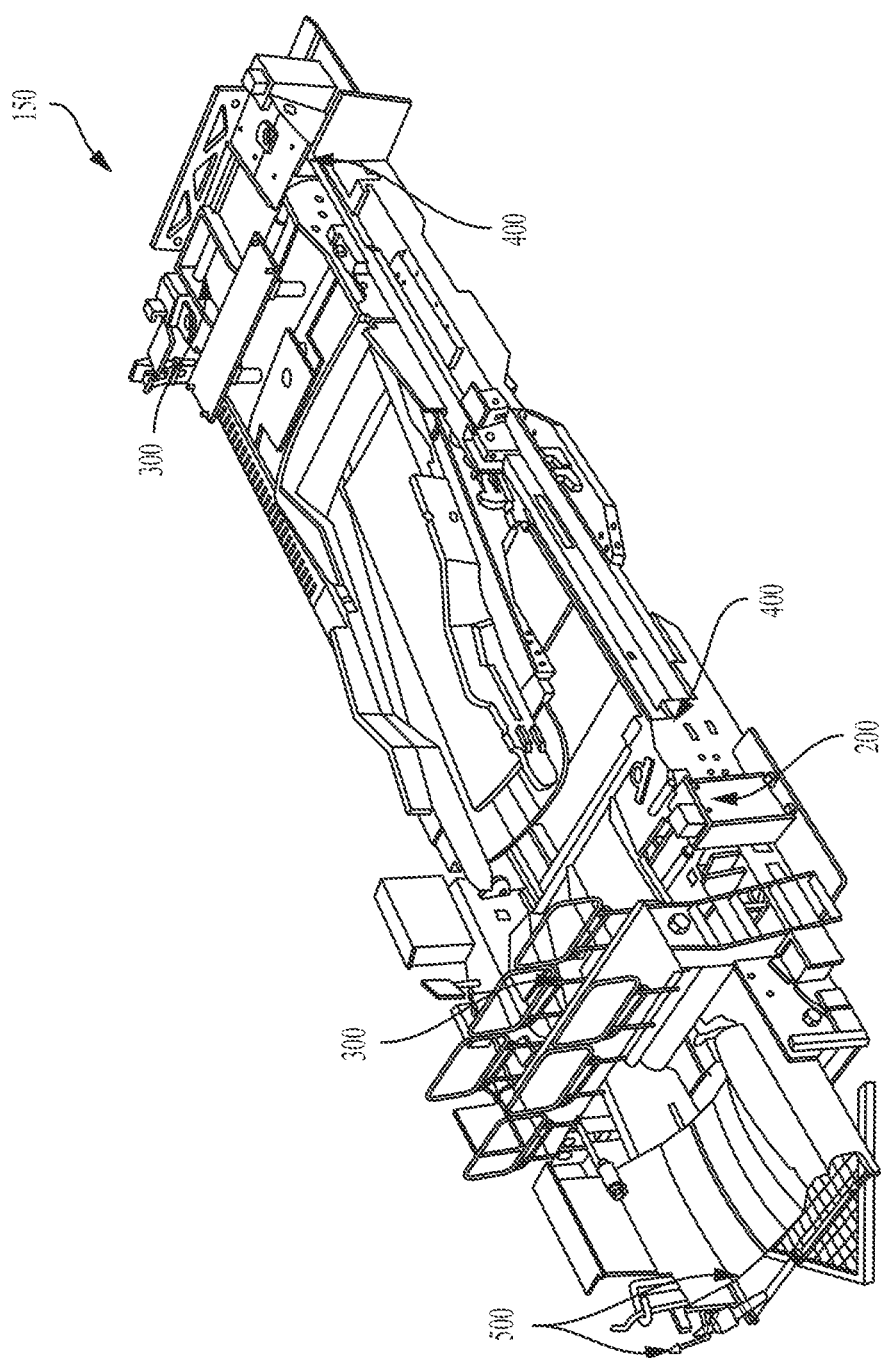
FIG. 10 illustrates a bootend, according to embodiments described herein.

FIG. 10 illustrates the bootend 150 (e.g., as a bootend frame) including a plurality of sensors. The sensors include lift cylinder linear transducers 200, side shift cylinder linear transducers 300, angle sensors 400 (e.g., inclinometers) for tilt sensing, and belt sensors 500 (e.g., ultrasonic sensors) for tracking the top and bottom runs of a conveyor belt (e.g., a lateral position of the conveyor belt with respect to the bootend 150).

Figure 12:
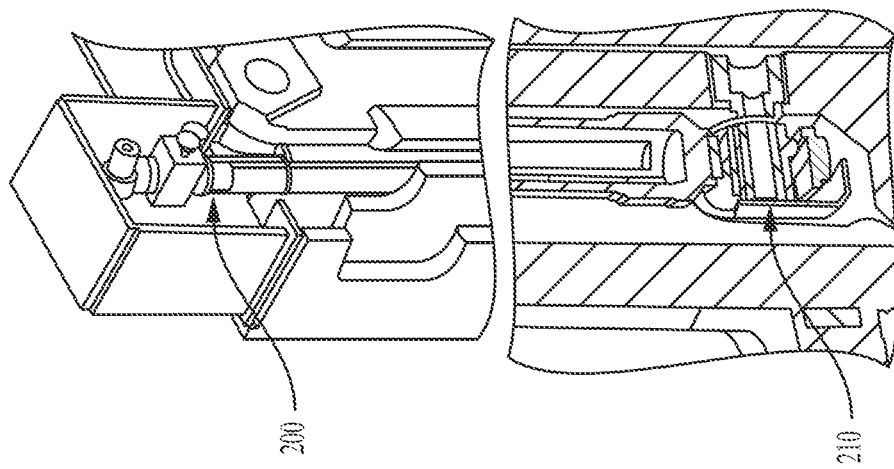
FIGS. 11 and 12 illustrate a lift cylinder linear transducer, according to embodiments described herein.
Figure 11:
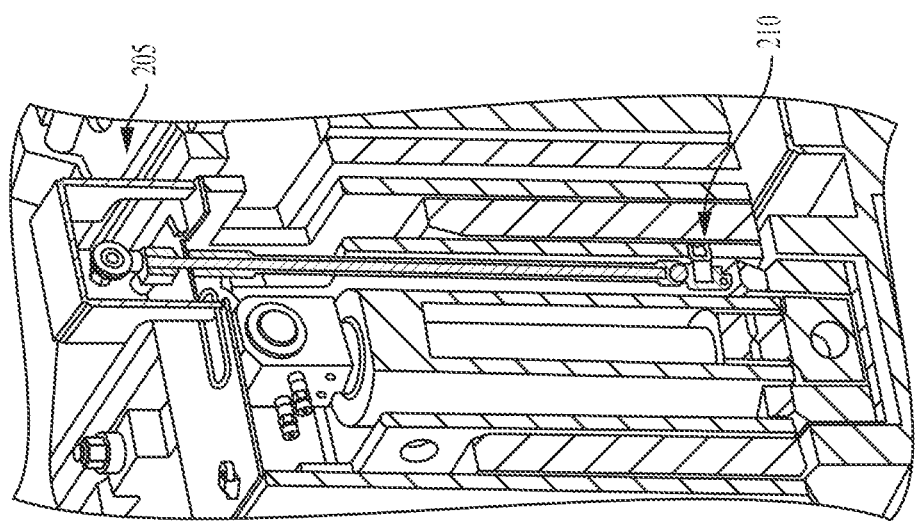

FIGS. 11 and 12 illustrate a lift cylinder linear transducer or lift sensor 200. The lift cylinder linear transducer 200 includes a protective cover 205 for protecting the inner rod and cable/connectors. The lift cylinder linear transducer 200 has a resolution of, for example, ±1 mm. The static section 210 of the lift cylinder linear transducer 200 is fixed to the bootend. In some embodiments, the lift cylinder linear transducer 200 is integrated into a lift cylinder. The bootend includes, for example, four lift cylinder linear transducers (e.g., one for each corner of the bootend).

Figure 14:
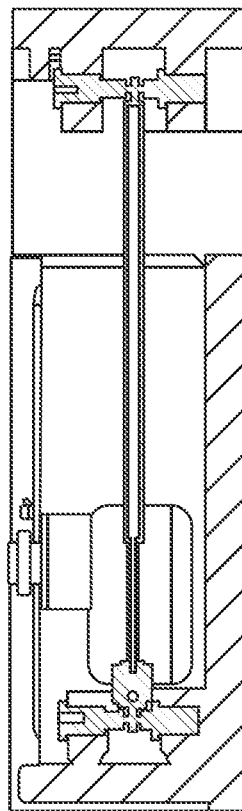
FIGS. 13 and 14 illustrate a side shift cylinder linear transducer, according to embodiments described herein.
Figure 13:
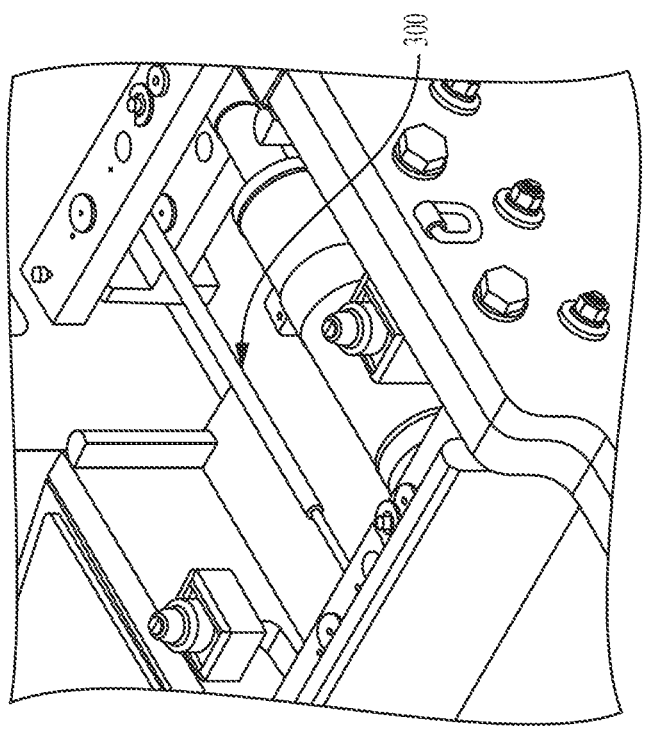

FIGS. 13 and 14 illustrate a side shift linear transducer or side shift sensor 300. The side shift linear transducer 300 can be mounted on the walkside of the bootend 150. The side shift linear transducer 300 has a resolution of, for example, ±1 mm. In some embodiments, the side shift linear transducer 300 is integrated into a side shift cylinder.

Figure 16:
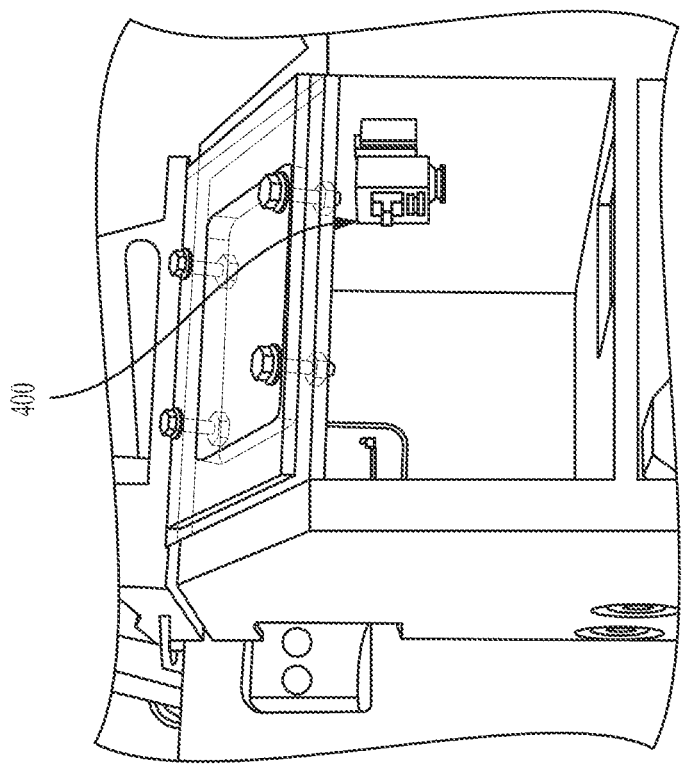
FIGS. 15 and 16 illustrate an angle sensor, according to embodiments described herein.
Figure 15:
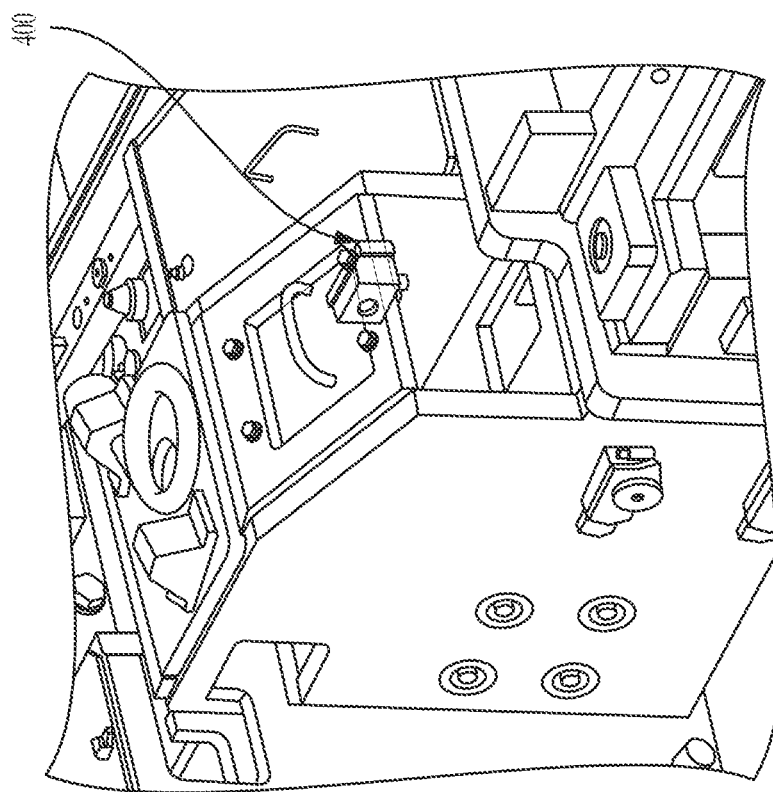

FIGS. 15 and 16 illustrate an angle sensor (e.g., inclinometer) 400 mounted on the bootend 150. The angle sensor 400 can be mounted in a position on the bootend 150 where it is protected from the environment and where accurate angle measurements can be taken.

Figure 18:
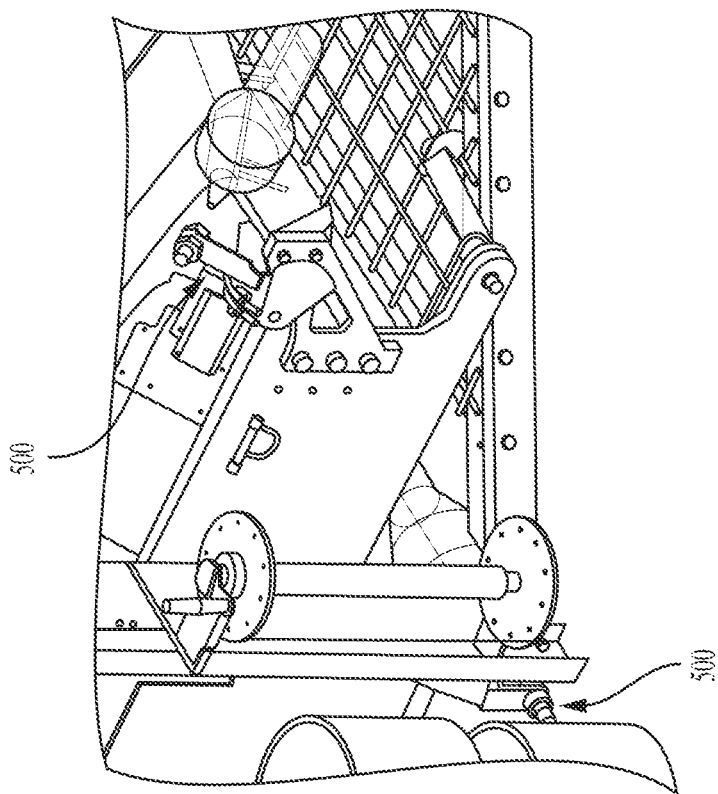
FIGS. 17 and 18 illustrate belt sensors, according to embodiments described herein.
Figure 17:
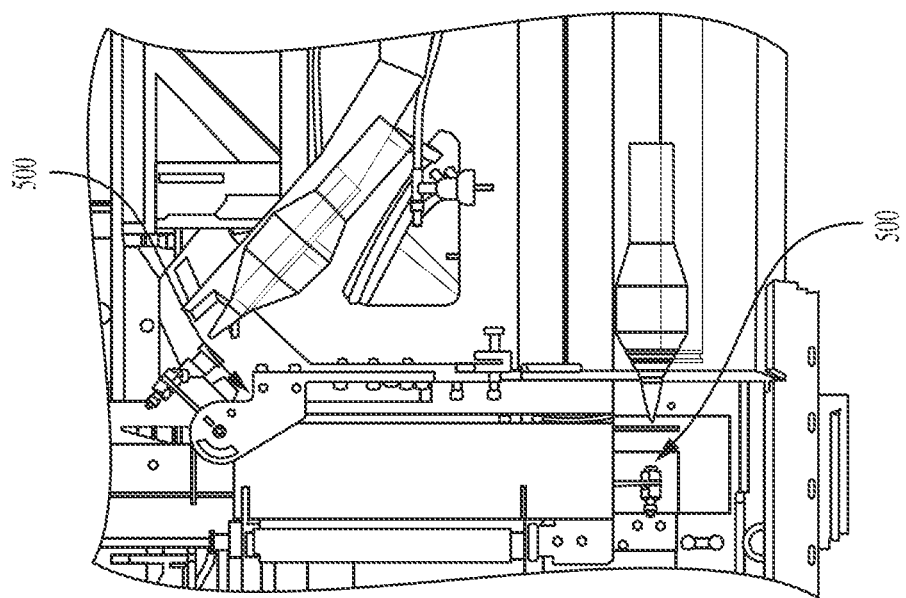

FIGS. 17 and 18 illustrate sensors (e.g., ultrasonic sensors) 500 for detecting conveyor belt position. The sensors 500 can be positioned in line with top and bottom runs of a conveyor belt.

Figure 19:
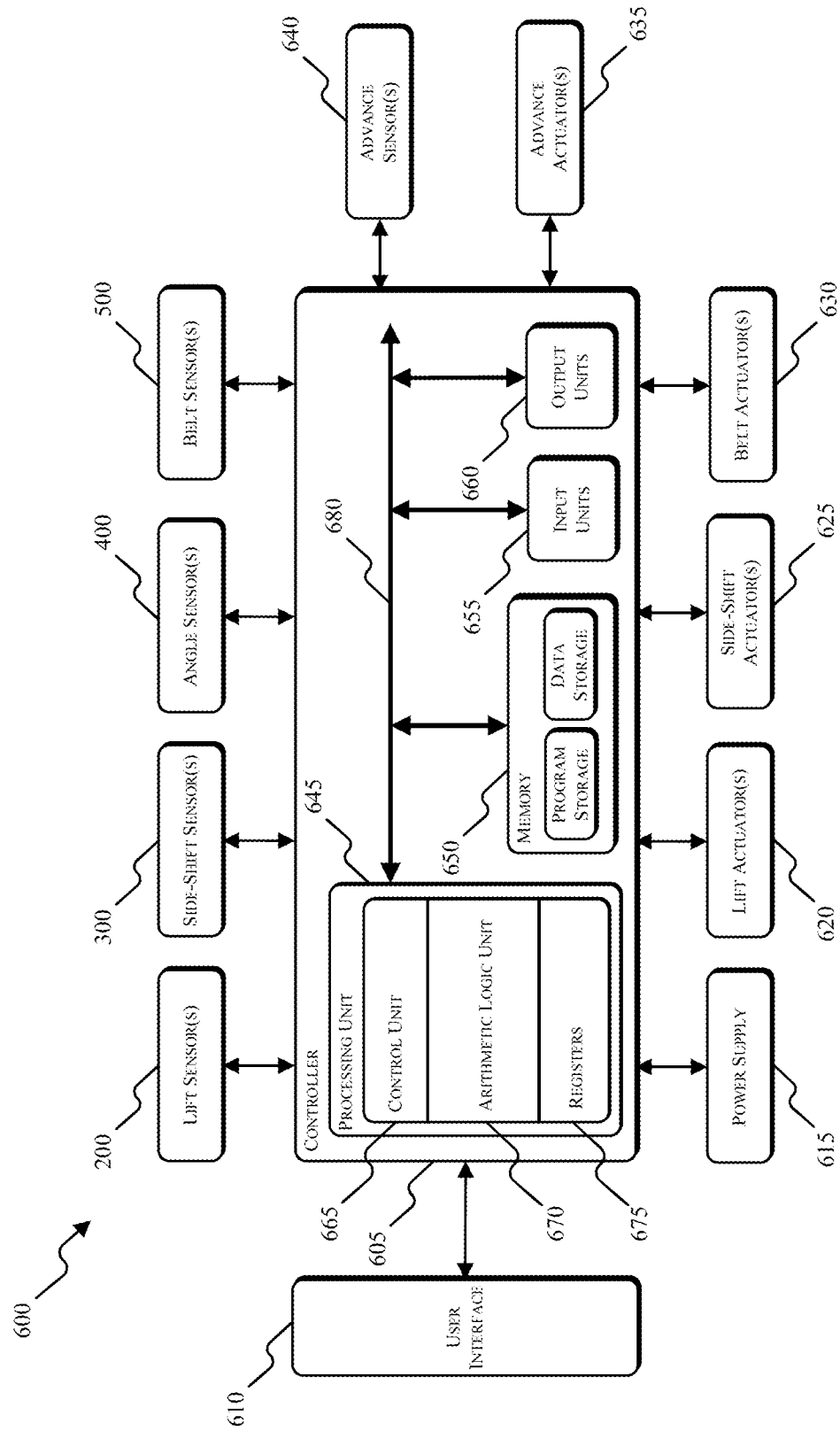
FIG. 19 illustrates a controller for the bootend of FIG. 10, according to embodiments described herein.

A control system 600 for the bootend 150 includes a controller 605, as illustrated in FIG. 19. The controller 605 is electrically and/or communicatively connected to a variety of modules or components of the bootend 150. For example, the controller 605 is connected to a user interface 610, a power supply module 615 (e.g., an AC power supply module receiving AC mains power), one or more lift actuators 620 (e.g., hydraulic lift cylinders), one or more side shift actuators 625 (e.g., hydraulic side shift cylinders), one or more belt actuators 630 (e.g., a motor), one or more advance actuators 635 (e.g., hydraulic advance cylinders), and one or more advance sensors 640 (e.g., linear transducers). The controller 605 is also connected to the one or more lift sensors 200, the one or more side shift sensors 300, the one or more angle sensors 400, and the one or more belt sensors 500. The controller 605 includes combinations of hardware and software that are operable to, among other things, control the operation of the bootend 150, control the operation of the longwall mining system 100, etc.

In some embodiments, the controller 605 includes a plurality of electrical and electronic components that provide power, operational control, and protection to the components and modules within the controller 605, the bootend 150, and/or the longwall mining system 100. For example, the controller 605 includes, among other things, a processing unit 645 (e.g., a microprocessor, a microcontroller, or another suitable programmable device), a memory 650, input units 655, and output units 660. The processing unit 645 includes, among other things, a control unit 665, an arithmetic logic unit ("ALU") 670, and a plurality of registers 675 (shown as a group of registers in FIG. 19), and is implemented using a known computer architecture (e.g., a modified Harvard architecture, a von Neumann architecture, etc.). The processing unit 645, the memory 650, the input units 655, and the output units 660, as well as the various modules connected to the controller 605 are connected by one or more control and/or data buses (e.g., common bus 680). The control and/or data buses are shown generally in FIG. 19 for illustrative purposes. The use of one or more control and/or data buses for the interconnection between and communication among the various modules and components would be known to a person skilled in the art in view of the invention described herein.

The memory 650 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 645 is connected to the memory 650 and executes software instructions that are capable of being stored in a RAM of the memory 650 (e.g., during execution), a ROM of the memory 650 (e.g., on a generally permanent basis), or another non-transitory computer readable medium such as another memory or a disc. Software included in the implementation of the longwall mining system 100 or the bootend 150 can be stored in the memory 650 of the controller 605. The software includes, for example, firmware, one or more applications, program data, filters, rules, one or more program modules, and other executable instructions. The controller 605 is configured to retrieve from the memory 650 and execute, among other things, instructions related to the control processes and methods described herein. In other constructions, the controller 605 includes additional, fewer, or different components.

The user interface 610 can be used to control and/or monitor the bootend 150. For example, the user interface 610 is operably coupled to the controller 605 to control the advancing of the bootend 150, the cross-leveling of the bootend 150, the side shifting of the bootend 150, etc. The controller 605 is configured to receive input signals from the user interface module 610. The user interface module 610 includes a combination of digital and analog input or output devices required to achieve a desired level of control and monitoring for the bootend 150. For example, the user interface module 610 includes a display (e.g., a primary display, a secondary display, etc.) and input devices such as touch-screen displays, joysticks, a plurality of knobs, dials, switches, buttons, pedals, etc. The user interface module 610 can also be configured to display conditions or data associated with the bootend 150 in real-time or substantially real-time. The controller 605 also receives motion command signals from the user interface module 610. The motion command signals are operable to control, for example, one or more of the lift actuators 620, side shift actuators 625, belt actuators 630, and advance actuators 635.

The controller 605 is also configured to receive one or more signals from each of the lift sensors 200, side shift sensors 300, angle sensors 400, belt sensors 500, and advance sensors 640. Based on the one or more signals received from the sensors, the controller 605 is configured to automatically control one or more of the lift actuators 620, side shift actuators 625, belt actuators 630, and advance actuators 635. For example, based on the one or more signals received from the sensors, the controller 605 is configured to generate one or more control signals for the lift actuators 620, side shift actuators 625, belt actuators 630, or advance actuators 635 to control the positioning of the bootend 150. The actuators, 620, 625, 630, and 635 are used to control, for example, inbye-to-outbye positioning, walkside-to-block-side positioning, foot pressures, advance, side shifting, and cross leveling of the bootend 150 as described above.

Figure 20:
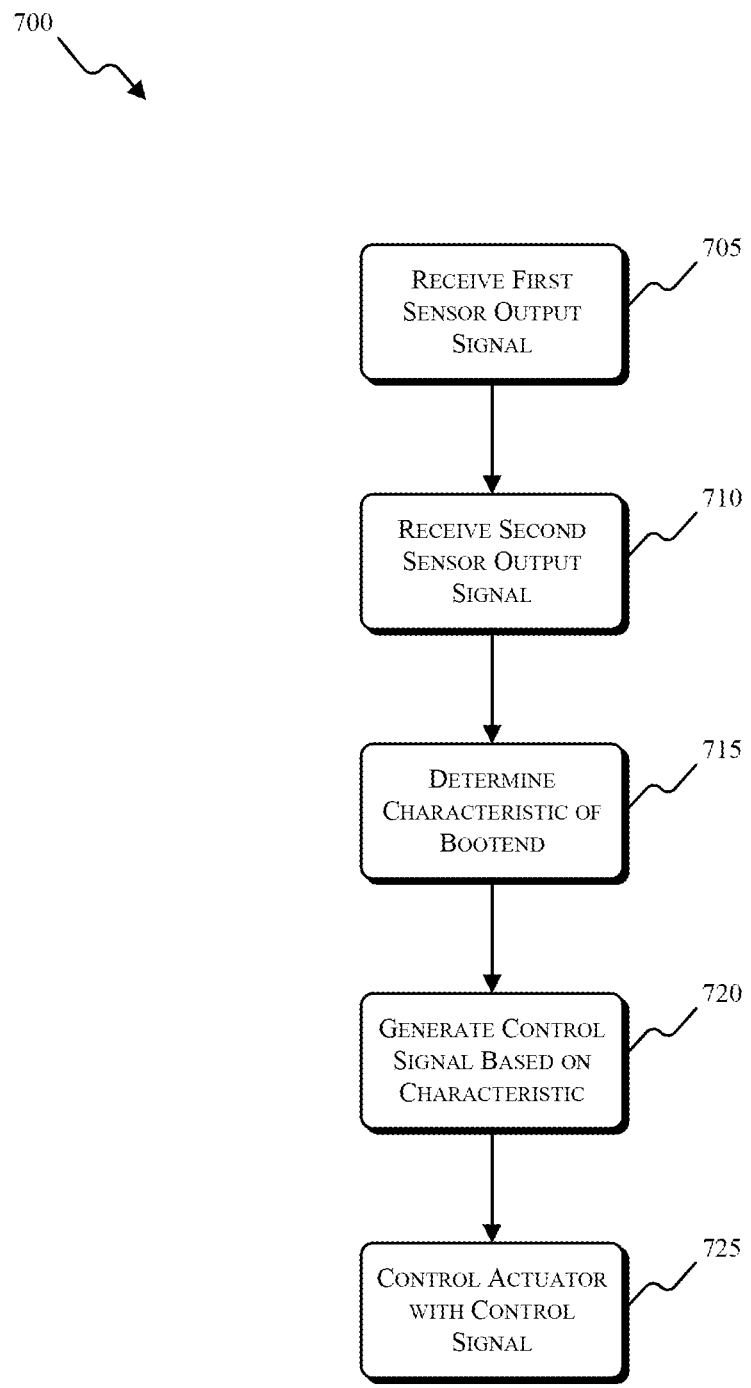
FIG. 20 is a process for controlling the bootend of FIG. 10, according to embodiments described herein.

FIG. 20 is a process 700 for automatically controlling the bootend 150. The process 700 begins with the controller 605 receiving a first sensor output signal (STEP 705). The first sensor output signal can be from any of the lift sensors 200, side shift sensors 300, angle sensors 400, belt sensors 500, or advance sensors 640. The controller 605 then receives a second sensor output signal (STEP 710). The second sensor output signal can be from any of the lift sensors 200, side shift sensors 300, angle sensors 400, belt sensors 500, or advance sensors 640. In some embodiments, the first sensor output signal and the second sensor output signal are received from the same type of sensor. In other embodiments, the first sensor output signal and the second sensor output signal are received from different types of sensors. The controller 605 is then configured to determine one or more characteristics of the bootend 150 (STEP 715). The one or more characteristics of the bootend 150 include, for example, a longitudinal position of the bootend 150, an axial or lateral position of the bootend 150, a lateral position of the bootend 150 with respect to a conveyor belt, a longitudinal position of the bootend 150 with respect to a conveyor belt, a pressure within a lift actuator, a lateral position of a conveyor belt, etc. Based on the one or more characteristics of the bootend 150, the controller 605 is configured to generate one or more control signals to control the bootend 150 (STEP 720). The one or more control signals can be control signals for lift actuators 620, side shift actuators 625, belt actuators 630, or advance actuators 635. The controller 605 then provides the one or more control signals to the actuators to correspondingly control the operation of the actuators (e.g., change a position of the actuators) (STEP 725).

Thus, embodiments described herein provide, among other things, systems and methods for automated control of a stageloader bootend. Various features and advantages are set forth in the following claims.

What is claimed is:

1. A beam stageloader bootend comprising:
at least one side shift actuator configured to laterally move the bootend with respect to a conveyor belt;
a side shift sensor configured to generate a side shift sensor output signal related to a lateral position of the bootend with respect to the conveyor belt; and
a controller connected to the side shift sensor and the at least one side shift actuator, the controller including a non-transitory computer readable medium and a processor, the controller including computer executable instructions stored in the computer readable medium for controlling operation of the bootend to:
receive the side shift sensor output signal,
determine the lateral position of the bootend with respect to the conveyor belt based on the side shift sensor output signal, and
generate a control signal for the at least one side shift actuator to adjust the position of the at least one side shift actuator based on the lateral position of the bootend with respect to the conveyor belt.

2. The bootend of claim 1, further comprising:
at least one lift actuator configured to raise or lower a portion of the bootend;
a lift sensor associated with the at least one lift actuator, the lift sensor configured to generate a lift sensor output signal related to a position of the at least one lift actuator; and
an angle sensor configured to generate an angle sensor output signal related to an angle of the bootend,
wherein the controller further includes computer executable instructions stored in the computer readable medium for controlling operation of the bootend to:
receive the lift sensor output signal,
receive the angle sensor output signal,
determine a longitudinal position of the bootend and an axial position of the bootend based on the lift sensor output signal and the angle sensor output signal, and
generate a control signal for the at least one lift actuator to adjust the position of the at least one lift actuator when the longitudinal position of the bootend or the axial position of the bootend indicate that the bootend is not level.

3. The bootend of claim 2, wherein the angle sensor is an inclinometer.

4. The bootend of claim 1, further comprising:
at least one advance actuator configured to move the bootend longitudinally with respect to the beam stageloader; and
an advance sensor configured to generate an advance sensor output signal related to a longitudinal position of the bootend with respect to the beam stageloader,
wherein the controller further includes computer executable instructions stored in the computer readable medium for controlling operation of the bootend to:
receive the advance sensor output signal,
determine the longitudinal position of the bootend with respect to the beam stageloader based on the advance sensor output signal, and
generate a control signal for the at least one advance actuator to adjust the position of the at least one advance actuator based on the longitudinal position of the bootend with respect to the beam stageloader.

5. The bootend of claim 1, further comprising a pressure sensor configured to output a pressure sensor output signal related to a pressure within at least one lift actuator,
wherein the controller further includes computer executable instructions stored in the computer readable medium for controlling operation of the bootend to:
receive the pressure sensor output signal,
determine the pressure within the at least one lift actuator based on the pressure sensor output signal, and
generate a control signal for the at least one lift actuator to adjust the pressure within the at least one lift actuator based on the pressure within the at least one lift actuator.

6. The bootend of claim 1, further comprising a belt sensor configured to output a belt sensor output signal related to a lateral position of the conveyor belt with respect to the bootend,
wherein the controller further includes computer executable instructions stored in the computer readable medium for controlling operation of the bootend to:
receive the belt sensor output signal,
determine the lateral position of the conveyor belt with respect to the bootend based on the belt sensor output signal, and
generate a control signal for the at least one side shift actuator to adjust the position of the at least one side shift actuator based on the lateral position of the conveyor belt with respect to the bootend.

7. The bootend of claim 6, wherein the belt sensor is an ultrasonic sensor.

8. A controller for controlling a beam stageloader bootend, the controller including a non-transitory computer readable medium and a processor, the controller including computer executable instructions stored in the computer readable medium for controlling operation of the bootend to:
receive a side shift sensor output signal from a side shift sensor;
determine a lateral position of the bootend with respect to a conveyor belt based on the side shift sensor output signal; and
generate a control signal for at least one side shift actuator to adjust the position of the at least one side shift actuator based on the lateral position of the bootend with respect to the conveyor belt.

9. The controller of claim 8, wherein the controller further includes computer executable instructions stored in the computer readable medium for controlling operation of the bootend to:
receive a belt sensor output signal from a belt sensor, the belt sensor output signal related to a lateral position of the conveyor belt with respect to the bootend;
determine a lateral position of the conveyor belt with respect to the bootend based on the belt sensor output signal; and
generate a control signal for the at least one side shift actuator to adjust the position of the at least one side shift actuator based on the lateral position of the conveyor belt with respect to the bootend.

10. The controller of claim 9, wherein the side shift sensor is a linear transducer and the belt sensor is an ultrasonic sensor.

11. The controller of claim 8, wherein the controller further includes computer executable instructions stored in the computer readable medium for controlling operation of the bootend to:

receive an advance sensor output signal from an advance sensor, the advance sensor output signal related to a longitudinal position of the bootend with respect to the beam stageloader;
determine the longitudinal position of the bootend with respect to the beam stageloader based on the advance sensor output signal; and
generate a control signal for at least one advance actuator to adjust the position of the at least one advance actuator based on the longitudinal position of the bootend with respect to the beam stageloader.

12. The controller of claim 8, wherein the controller further includes computer executable instructions stored in the computer readable medium for controlling operation of the bootend to:
receive a pressure sensor output signal from a pressure sensor, the pressure sensor output signal related to a pressure within at least one lift actuator;
determine the pressure within the at least one lift actuator based on the pressure sensor output signal, and
generate a control signal for the at least one lift actuator to adjust the pressure within the at least one lift actuator based on the pressure within the at least one lift actuator.

13. The controller of claim 8, wherein the controller further includes computer executable instructions stored in the computer readable medium for controlling operation of the bootend to:
receive an angle sensor output signal from an angle sensor, the angle sensor output related to an angle of the bootend;
determine a longitudinal position of the bootend and an axial position of the bootend based on the angle sensor output signal; and
generate a control signal for at least one lift actuator to adjust the position of the at least one lift actuator when the longitudinal position of the bootend or the axial position of the bootend indicate that the bootend is not level.

14. The controller of claim 8, wherein the at least one side shift actuator, the side shift sensor, and the controller are incorporated into the beam stageloader bootend.

15. A computer-implemented method for controlling a beam stageloader bootend, the bootend including at least one side shift actuator and a side shift sensor, the method comprising:
receiving a side shift sensor output signal from the side shift sensor;
determining the lateral position of the bootend with respect to a conveyor belt based on the side shift sensor output signal; and
generating a control signal for the at least one side shift actuator to adjust the position of the at least one side shift actuator based on the lateral position of the bootend with respect to the conveyor belt.

16. The computer-implemented method of claim 15, further comprising:
receiving a belt sensor output signal from a belt sensor, the belt sensor output signal related to a lateral position of the conveyor belt with respect to the bootend;
determining a lateral position of the conveyor belt with respect to the bootend based on the belt sensor output signal; and
generating a control signal for the at least one side shift actuator to adjust the position of the at least one side shift actuator based on the lateral position of the conveyor belt with respect to the bootend.

17. The computer-implemented method of claim 16, wherein the side shift sensor is a linear transducer and the belt sensor is an ultrasonic sensor.

18. The computer-implemented method of claim 15, further comprising:
receiving an advance sensor output signal from an advance sensor, the advance sensor output signal related to a longitudinal position of the bootend with respect to the beam stageloader;
determining the longitudinal position of the bootend with respect to the beam stageloader based on the advance sensor output signal; and
generating a control signal for at least one advance actuator to adjust the position of the at least one advance actuator based on the longitudinal position of the bootend with respect to the beam stageloader.

19. The computer-implemented method of claim 15, further comprising:
receiving a pressure sensor output signal from a pressure sensor, the pressure sensor output signal related to a pressure within at least one lift actuator;
determining the pressure within the at least one lift actuator based on the pressure sensor output signal, and
generating a control signal for the at least one lift actuator to adjust the pressure within the at least one lift actuator based on the pressure within the at least one lift actuator.

20. The computer-implemented method of claim 15, further comprising:
receiving an angle sensor output signal from an angle sensor, the angle sensor output related to an angle of the bootend;
determining a longitudinal position of the bootend and an axial position of the bootend based on the angle sensor output signal; and
generating a control signal for at least one lift actuator to adjust the position of the at least one lift actuator when the longitudinal position of the bootend or the axial position of the bootend indicate that the bootend is not level.

\* \* \* \* \*